United States Patent
Markandey et al.

(10) Patent No.: US 6,526,144 B2
(45) Date of Patent: *Feb. 25, 2003

(54) DATA PROTECTION SYSTEM

(75) Inventors: Vishal Markandey, Dallas, TX (US); Alan T. Wetzel, Parker, TX (US); Fred J. Shipley, Lucas, TX (US); Roy I. Edenson, Richardson, TX (US); Ryan R. Middleton, Plano, TX (US); William E. Cammack, Dallas, TX (US)

(73) Assignee: Texas Instruments Incorporated, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/088,556

(22) Filed: Jun. 2, 1998

(65) Prior Publication Data

US 2002/0101989 A1 Aug. 1, 2002

Related U.S. Application Data

(60) Provisional application No. 60/048,266, filed on Jun. 2, 1997.

(51) Int. Cl.$^7$ ................................. H04L 9/00
(52) U.S. Cl. .................. 380/28; 705/51; 705/57; 380/264; 380/277; 713/160
(58) Field of Search ............. 380/28, 264, 277; 705/51, 57; 713/160

(56) References Cited

U.S. PATENT DOCUMENTS

| | | | | | |
|---|---|---|---|---|---|
| 5,905,798 | A | * | 5/1999 | Nerlikar et al. | 705/57 |
| 6,005,940 | A | * | 12/1999 | Kulinets | 705/51 |
| 6,167,136 | A | * | 12/2000 | Chou | 380/201 |
| 6,198,875 | B1 | * | 3/2001 | Edenson et al. | 386/94 |

* cited by examiner

*Primary Examiner*—Gilberto Barrón
*Assistant Examiner*—Paul Callahan
(74) *Attorney, Agent, or Firm*—Pedro P. Hernandez; W. James Brady, III; Frederick J. Telecky, Jr.

(57) ABSTRACT

A method of communicating from a transmitter to a receiver over a communication medium. For the transmitter, the method includes the step of formatting data into a data stream to be communicated across the communications medium. This data stream comprises a plurality of headers (PACK HEADER). Moreover, for each of the plurality of headers, the method performs two steps. First, the method modifies information encoded by the header by performing a bitwise logical operation between selected bits of the header (B) with a predetermined bit pattern (A). Second, the method transmits the plurality of headers on to the communications medium. For the receiver, the method includes the step of receiving the plurality of headers from the communications medium. Additionally, for each of the received headers, the receiver recovers the information encoded by the header.

23 Claims, 3 Drawing Sheets

DATA PROTECTION SYSTEM

CROSS-REFERENCES TO RELATED APPLICATIONS

This application claims the benefit, under 35 U.S.C. §119(e)(1), of U.S. Provisional Application No. 60/048,266, filed Jun. 2, 1997, entitled "Data Protection System," having as its inventors Vishal Markandey, Alan Wetzel, Fred Shipley, Roy Edenson, Ryan Middleton, and William Cammack, and incorporated herein by this reference.

STATEMENT REGARDING FEDERALLY SPONSORED RESEARCH OR DEVELOPMENT

Not Applicable.

BACKGROUND OF THE INVENTION

The present embodiments relate generally to data communications security and, more particularly, to a layered data protection system which provides secured communications over the IEEE 1394-1995 High Performance Serial Bus (hereinafter, "the 1394 bus").

With the advent of the '1394 Bus, it is anticipated and indeed an exciting expectation that much larger and faster data capabilities will soon be implemented in numerous computer-controlled applications Such applications currently contemplate various consumer implementations, likely supporting various data formats, including DVD (originally identified as "Digital Video Disc" but now more often called "Digital Versatile Disc" because it can be used to store computer data as well as video), digital VCR ("D-VCR"), digital satellite system, digital television (DTV), and possibly others. With these capabilities, however, there arises a heightened concern on behalf of the creators and owners of the data to protect it as it passes along the system on the 1394 bus. The present embodiments are directed to such issues.

A key factor in achieving an effective implementation of any or all of the components of the present embodiments as well as other data protection systems is the elimination of data in-the-clear on any accessible interfaces. The value of having robustly encrypted data on a digital interface such as the 1394 interface will be completely negated if the unencrypted form of that data is also available at some other accessible location. This leads to two conclusions which may be implemented using the preferred embodiments discussed later: (1) The data should be encrypted before leaving the original source equipment, such as internally in a DVD drive or the Network Interface Module in a set top box; and (2) The data should stay encrypted until it is received within the destination equipment, such as a TV or monitor.

These goals are relatively easy to achieve for traditional closed-box, non-modifiable consumer electronic equipment, but are significantly more difficult to achieve for a personal computer (PC). In this latter case the PC equipment is designed to be easily opened and modified with changeable cards or modules having standardized interfaces such as the ISA and PCI busses, or the advanced graphics port. Allowing data in-the-clear to travel over any of these busses or interfaces leaves a tempting opportunity for black market add-ons which may tap into the data stream for recording and subsequent playback and reproduction.

In view of the above, there arises a need to address the increase in protection of data to be communicated, or while being communicated, over the '1394 bus, and this need should be balanced in terms of other resource issues such as the cost and complexity of the protection structure and methods, as well as the likelihood of a wrongdoer overcoming the protection provided by such structure and methods.

BRIEF SUMMARY OF THE INVENTION

In one embodiment, there is a method of communicating from a transmitter to a receiver over a communications medium. For the transmitter, the method includes the step of formatting data into a data stream to be communicated across the communications medium. This data stream comprises a plurality of headers. Moreover, for each of the plurality of headers, the method performs two steps. First, the method modifies information encoded by the header by performing a bitwise logical operation between selected bits of the header with a predetermined bit pattern. Second, the method transmits the plurality of headers on to the communications medium. For the receiver, the method includes the step of receiving the plurality of headers from the communications medium. Additionally, for each of the received headers, the receiver recovers the information encoded by the header.

In another embodiment, there is provided an information package medium. The package medium comprises means for storing a plurality of data quantities. Each of the plurality of data quantities comprises a set of bits. The package medium further comprises a plurality of machine-readable scramble codes, and each of the plurality of machine-readable scramble codes corresponds to one of the plurality of data quantities and indicates a manner of descrambling the corresponding one of the plurality of data quantities.

Other circuits, systems, and methods are also disclosed and claimed.

DETAILED DESCRIPTION OF THE INVENTION

The present embodiments relate to a data protection system that can be used to protect digital data (e.g., digital video, digital audio, etc.) transmitted on the IEEE 1394-1995 High Performance Serial Bus. The description of the preferred embodiments which follow addresses, among other things, the areas of data encryption, key exchange, authentication, and copy control information (CCI).

By way of introduction, a system implementing each of the aspects of the preferred embodiments is a layered data protection system, which is based on differing levels of protection for various types of digital data. For purposes of the preferred embodiments, the types of digital data to be transmitted over a 1394 interface are divided into the following three groups, listed here in order from the specific to the general: (a) packaged data, that is, data stored on some type of medium or "package", e.g., digital versatile disk (DVD) and digital video cassette for a digital video cassette recorder (D-VCR); (b) transmitted compressed data, e.g., transmitted packaged data which has been compressed, or other transmitted data including data relating to a (i) digital satellite system or (ii) digital television (DTV) broadcasts; and (c) digital data, e.g., compressed data plus uncompressed data, such as computer data and medical data. In the preferred embodiment the protection of any of these three groups of data may be nested, that is, a specific data type may be protected according to a first methodology for that data type, and then combined with a general data type such that both the general data and the specific data are further protected according to a second methodology.

By way of further introduction to the data protection approach of the preferred embodiments, protection is introduced here in an order in reverse relative to the preceding introduction of the three types of data protected. In this regard and starting with digital data, a base layer of the data protection system is provided for all digital data delivery over the 1394 interface. This base layer is grounded on the use of standard, well-known cryptographic techniques including Data Encryption Standard and Diffie-Hellman Key Exchange algorithms. A second layer of protection, specific to compressed data delivery over the 1394 interface, is also disclosed and scrambles a synchronization pattern in the data by performing a logical operation with a multiple bit signal, where in the preferred embodiment the multiple bit signal is taken from a clock. Finally, a third layer of protection is disclosed for packaged data delivery over the 1394 interface, where a data scrambling pattern is included as part of the information stored by the package. Each of these aspects is further detailed by the following Figures and the discussion thereof.

Figure 1:
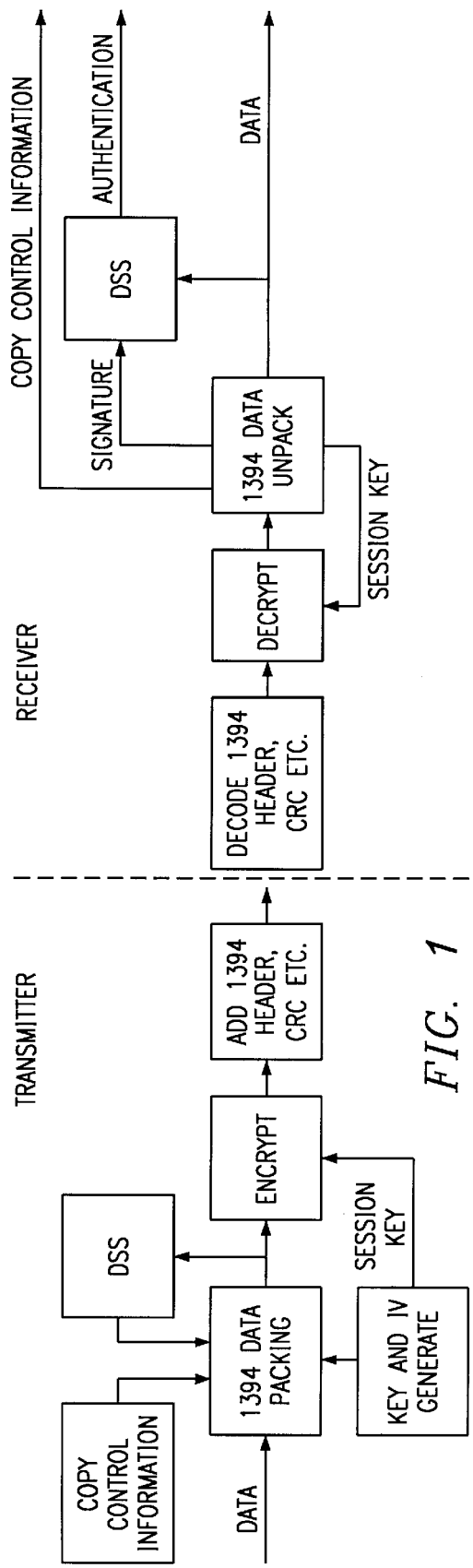
FIG. 1 illustrates a block diagram of a data communications system in which various of the present embodiments may be implemented.

FIG. 1 provides an overview of the preferred approach for the first, or base layer of the data protection system of the present invention, which is used for digital data protection. The incoming data is encrypted using a 56-bit key Data Encryption Standard DES) algorithm in Cipher Block Chaining (CBC) mode. See Data Encryption Standard, FIPS Pub 46, U.S. Department of Commerce/National Bureau of Standards, January 1977, and DES Modes of Operation, FIPS Pub 81, U.S. Department of Commerce/National Bureau of Standards, December 1980, hereby incorporated herein by reference.

A new DES key is used for encryption/decryption every 50 (or some other agreed to number) 1394 isochronous packets. Keys are generated using the ANSI X9.17 key generation standard, as described in ANSI X9.17 (Revised), "American National Standard for Financial Institution Key Management (Wholesale)," American Bankers Association, 1985, hereby incorporated herein by reference. Keys may be 56 bits, with 8 parity bits added to provide a final key of 64 bits. In order to provide authentication capability, the Digital Signature Standard (DSS), as described in FIPS PUB 186, U.S. Department of Standards/National Institute of Standards and Technology, May 1994, is used, and hereby incorporated herein by reference.

The encrypted data, digital signature and key values, as well as copy control information (CCI) are time multiplexed into the 1394 data transmission stream using a packet format scheme which is more fully described below. At the receiver, these components are demultiplexed and decrypted. The decrypted digital signature value is authenticated using DSS. If the authentication fails, appropriate action is taken.

Data encryption in the preferred embodiment of the data protection system may be implemented using the Data Encryption Standard (DES). First published as a U.S. encryption standard in 1977, this algorithm has been used for a wide range of applications and has endured as a secure method for data protection. DES encrypts 64-bit blocks of data using a 64-bit session key (56 randomly generated bits plus 8 parity bits) to produce a 64-bit encrypted result. DES provides methods for different modes of operation. For encrypting blocks of data two modes are specified in the DES standard, a first being the Electronic Codebook (ECB) and a second being Cipher Block Chaining (CBC). Each is discussed below.

With ECB, each 64-bit block of data is encrypted using the same 64-bit key. This can lead to possible security problems, since the same input block will produce the same encrypted block. To avoid this, the preferred embodiment mode of operation for encryption is CBC.

With CBC, each input data block is exclusive ORed with the previously encrypted block before it is subjected to encryption. For the first block of data, a randomly generated 64-bit initialization vector (IV) is used for this exclusive OR operation. For additional information on DES, see the above-referenced and incorporated Data Encryption Standard, FIPS Pub 46, and DES Modes of Operation, FIPS Pub 81.

In the event that a residual block, i.e., a block with less than 64 bits, must be encrypted, a method for processing that short block must be implemented. In the preferred embodiment the method for processing the residual block is as follows, and is described in Bruce Schneier, "Applied Cryptography," John Wiley & Sons, New York, 1993, hereby incorporated herein by reference:

(a) Assume the short block consists of N bits, where N<64.
(b) The previously encrypted full 64-bit block is encrypted a second time.
(c) The N least significant bits of the encrypted output are exclusive ORed with the short block to produce the final encrypted block.

Data authentication in the preferred embodiment of the data protection system may be implemented through the Secure Hash Algorithm (SHA-1) and the Digital Signature Standard (DSS). With SHA-1, N blocks of unencrypted data are hashed into a unique 160-bit value called a message digest. DSS is then used to sign the hash data. DSS operation is divided into three parts:

a) Public and private data generation. DSS generates 4 values which can be public information:
  p: a 640-bit prime value. This value is greater than or equal to 512 and less than or equal to 1024 bits and must be a multiple of 64;
  q: a prime divisor of p-1 (160 bits);
  g: value calculated from p, q, and a random value h (see the above-noted and incorporated FIPS PUB 186, U.S. Department of Standards/National Institute of Standards and Technology, May 1994) (160 bits);
  y: public key (640 bits);
  x: private key (640 bits); and
  k: random number 0<k<q.

The values of p, q, g, and y are public; x and k are private values and must be kept secret.

b) Signature generation. This digitally signs a hash value (created with SHA-1) using the transmitter's private key. Two 160-bit values are produced, r and s. These r and s values will be sent in the isochronous packets.

c) Signature verification. The receiver computes the hash value and sends it through the verification stage of DSS along with the received digital signature and the transmitter's public key. The verification portion of DSS gives a "yes" or "no" answer to signify if the signature is verified.

When a new device is plugged into the 1394 bus, a bus reset occurs. At this point, new values for DSS are generated and the public values (p, q, g, and y) are sent to the new receiver over the asynchronous channel (in addition to the Diffie-Hellman key exchange). The p, q, g, and y values do not have to be encrypted.

Lastly with respect to FIG. 1, note that various of its aspects may be included in different components of a 1394 system. For example, recall it was earlier discussed in the Background Of The Invention section of this document that certain considerations should be made with respect to certain components to avoid data in-the-clear accessible interfaces. Thus, for video information, one approach is putting the destination 1394 interface port plus the decryption, decompression, etc., circuitry into the PC monitor. Such an approach, however, is a significant shift from present architectural models, although it is similar in some ways to that of a TV set. A more acceptable solution for PCs may to put the destination 1394 port on the graphics card along with the decryption, decompression and graphics processing hardware. Even with all the components on a single card there could still be opportunities for an enterprising pirate to solder on his own connectors to access the in-the-clear data, although that would clearly be more difficult than tapping into a well defined bus or interface. Implementation of the functions into a single integrated circuit would further reduce the opportunities for piracy, although it would not entirely eliminate it. For other types of data, still other considerations may be involved. In any event, it is contemplated that one skilled in the art may implement various of the functionality discussed in this document in various of the different components which connect to the 1394 bus.

Figure 2:
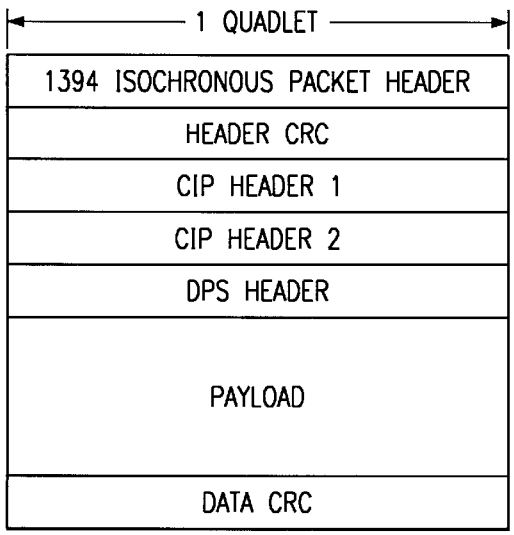
FIG. 2 illustrates a 1394 packet used for digital data protection in accordance with an invention embodiment.

FIG. 2 illustrates an example of the 1394 isochronous packet structure for implementing the data protection system of the preferred embodiment. One quadlet, a 32-bit value, of the isochronous packet is reserved as the data protection system header. The number of DES encrypted data blocks carried per isochronous packet is a function of the data rate of the application divided by the 1394 isochronous packet rate of 8 Kbit/sec. For example, a stream of 11.08 Mbit/sec of user data flowing into a track buffer can be completely carried by an isochronous packet containing 22 DES encrypted data blocks, equivalent to 1,408 bits or 176 bytes. The number of DES encrypted blocks carried per packet can be adjusted as needed depending on the specific application requirements.

The data protection system packet format of FIG. 2 is a variation of the Common Isochronous Packet (CIP) format that has been developed for carrying MPEG-2 transport packet video data over the 1394 interface. Development of the CIP format was initiated by members of the 1394 Trade Association, fine tuned and formally documented by the HD-DVC Consortium, HD Digital VCR Conference, "Specifications of Consumer-Use Digital VCRs using 6.3 mm magnetic tape" (the Bluebook), Part 1"General Specifications for Consumer-Use Digital Interface," December 1995, hereby incorporated herein by reference, and is now internationally standardized as IEC 61883. For DVD application, since the DVD system uses MPEG-2 program stream packets having a different length than the 188-byte transport packets, a new definition for the CIP format is necessary.

Some specific items of the presently defined CIP format for the 188-byte Motion Picture Engineering Group (MPEG) transport stream packets are not compatible with the larger DVD 2,048-byte "pack" which is a subelement of a program stream packet. If the data block size (DBS) is assumed to be the 64-bit DES encrypted data block, then the fraction number (FN), quadlet padding count (QPC), and data block counter (DBC) will need new definitions. In addition, the format ID (FMT) value for MPEG needs to be clarified that it is for the MPEG transport stream in addition to adding a new value to indicate the 2,048-byte DVD programs stream packet.

Various elements of the data protection system of the preferred embodiment, such as copy control information (CCI), encryption keys, initialization vectors for CBC mode operation of DES, and hash values, are transmitted in the data protection system header. These values are transmitted in a time multiplexed manner, taking advantage of the fact that they are needed periodically rather than continuously to keep the amount of 1394 bandwidth allocated to their transmission at a minimum.

The data protection system processes transmission of data in bundles of, by way of illustration, 50 isochronous packets. New session keys and initialization vectors are used for every bundle, and are randomly generated by the transmitter. SHA-1 is used only for the first 40 isochronous packets and the results are transmitted, resulting in the following sequence of operations:

(a) The transmitter hashes the first 40 packets;

(b) It then computes a digital signature using its private key and the hash value, where this digital signature equals the r and s values;

(c) r and s are transmitted to the receiver in the 41–50 isochronous packets;

(d) The receiver hashes the same 40 packets;

(e) The receiver receives r and s; and (f) The receiver uses r, s, the hash value, and the transmitter's public key and runs the verification portion of DSS with these values.

Figure 3:
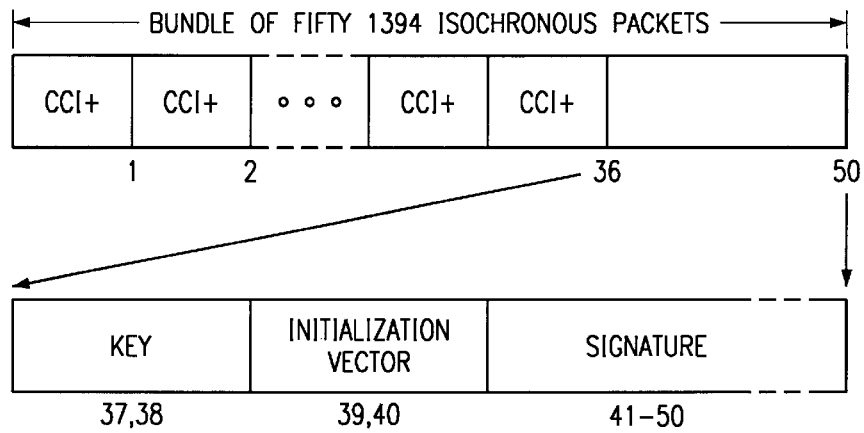
FIG. 3 illustrates the data protection information which is sent in a bundle of fifty 1394 isochronous packets.

FIG. 3 illustrates which pieces of the data protection system information will be transmitted for each of the packets in a bundle, where recall that in the present example a bundle includes 50 isochronous packets.

Details of various elements of encryption information transmitted in the data protection system header are summarized in Table 1, below:

TABLE 1

| Isochronous packet no. | data protection system header content | Description of data protection system header content |
|---|---|---|
| 1–36 | CCI | |
| 37 | KeyHigh | most significant 32 bits of new key |
| 38 | KeyLow | least significant 32 bits of new key |
| 39 | IVHigh | most significant 32 bits of new IV |
| 40 | IVLow | least significant 32 bits of new IV |
| 41–45 | r | 160 bit r value |
| 46–50 | s | 160 bit s value |

In packets number 1–36, the data protection system header will contain the copy control information bits as shown in the following Table 2:

TABLE 2

| | |
|---|---|
| Copy Generation Management Information | bits 1–0 |
| Analog Protection System Trigger Bits | bits 3–2 |
| Digital Source Bit | bit 4 |

Upon receipt of the $50^{th}$ isochronous packet, the receiver compares the message digests to ensure that the data is coming from a legitimate source. The receiver will also reset the DES implementation so that the newly received key and initialization vector can be used on the next isochronous packet.

The remaining 27 bits of the quadlet used in part as illustrated in Table 2 may be reserved for future enhancements of the CCI as well as other information. Specifically, although 56-bit key length is defined for DES, key length has been a source of ongoing debate in cryptographic circles. A weaker variation of DES, having a 40-bit key length has been used in some applications. Also, as technology becomes more powerful, more sophisticated cryptanalysis techniques may be developed that may compromise 56-bit DES. To ensure future extensibility to greater key lengths and provide facility to use other new algorithms that may be developed, part of the data protection system header quadlet may be reserved for such information as shown in the following Table 3, for example:

TABLE 3

| | |
|---|---|
| DES Key Length | bits 5–12 |
| Encryption Algorithm Identifier | bits 13–20 |

The second layer of the data protection scheme of the present invention is specific to compressed data to be transmitted over the 1394 system. Compressed data is available in packet form, with associated packet headers. By way of introduction, the protection scheme is based on modifying the packet header contents with 1394 clock information and transmitting this modified header information. Unless the receiver is synchronized with the transmitter clock and configured to recognize the modified header, it will be unable to derive the original header information to use the compressed data stream. An additional measure of protection is provided by randomly varying the modification of header information with 1394 clock information.

While this technique can, in general, be used with any compressed data form, details are presented here for the currently prevalent MPEG compression, as it is used in various applications such as DVD, digital video broadcast (DVB) and DTV. Generalization for other future compression techniques is also disclosed. This technique also may be adapted to other uncompressed data formats, but the details tend to be somewhat dependent on the specifics of those other formats, and are not necessary to an understanding to this second level of the protection scheme of the present invention.

Figure 4:
FIG. 4 illustrates the basic structure of a program stream.

MPEG data streams can be program streams for DVD, or transport streams for broadcast applications such as DTV or DVB. The basic structure of a program stream is shown in FIG. 4, consisting of consecutive pack headers and packs, with each pack consisting of program elementary stream (PES) packets containing PES header and payload.

In accordance with a preferred embodiment of the present invention, the first 32 bits of the pack header are modified using 1394 system clock valuens. This region of the pack header corresponds to a field in the header referred to as pack_start_code. Scrambling this data ensures that a decoder will be unable to find the start location of the corresponding pack unless the descrambling operation is performed correctly. More specifically, in a 1394 network, each node with isochronous service has a 32-bit cycle time register, and for the present document this register is referred to as the CYCLE_TIME register. The low-order 12 bits of this register are a modulo 3,072 count which increments once every 24.576 MHz clock period, the next 13 higher order bits count 8 KHz cycles, while the highest 7 bits count seconds. Additionally, the cycle master copies the time stamp in its CYCLE_TIME register to the CYCLE_TIME register in each of the isochronous nodes with the cycle start packet, synchronizing all nodes within a constant phase difference. This functionality is further augmented as described below to modify the pack header.

Figure 5:
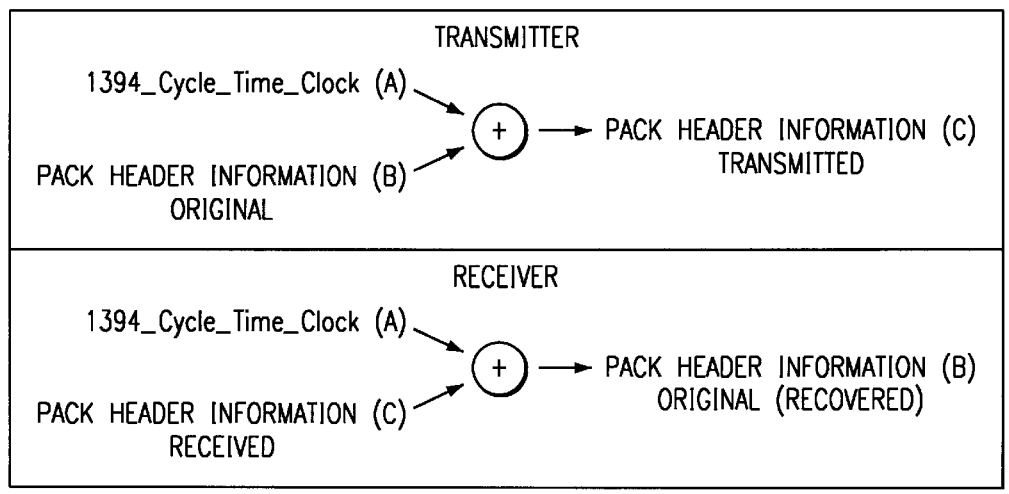
FIG. 5 illustrates a compressed data protection scheme in accordance with an inventive embodiment.

FIG. 5 illustrates in greater detail a bitwise logical operation which is performed by the preferred embodiment to modify the first 32 bits of the pack header using the 1394 system clock values as introduced above. By way of example, assume that the common cycle time register value of the network is designated as 1394_Cycle_Time_Clock, which in FIG. 5 is shown as providing a signal A. Next, assume that the first 32 bits of the pack header provide a signal shown in FIG. 5 as B. Then, in the preferred embodiment, the following bitwise exclusive OR operations of Table 4 are performed to achieve this layer of data protection:

TABLE 4

| A | B | C | D = B |
|---|---|---|---|
| 0 | 0 | 0 | 0 |
| 0 | 1 | 1 | 1 |
| 1 | 0 | 1 | 0 |
| 1 | 1 | 0 | 1 |

The above Table 4 first illustrates a value of C which, from FIG. 5, is appreciated as the actual information transmitted by the transmitter on to the 1394 medium. Thus, the value of C represents a first bitwise exclusive OR operation between the common cycle time register value 1394_Cycle_Time_Clock and corresponding bits in the pack header information. Table 4 further illustrates a value of D which, from FIG. 5, is appreciated as the information after it is received and assuming it is properly decoded according to the preferred embodiment. More specifically, in the preferred embodiment, such a receiver also performs a bitwise exclusive OR operation, where the operation is between the pack header information C received from the 1394 medium (i.e., after it has been through the first bitwise exclusive OR operation) and again the corresponding bits from the common cycle time register value 1394_Cycle_Time_Clock. Because this second bitwise exclusive OR operation is with the same pattern as was the first bitwise exclusive OR operation (i.e., 1394_Cycle_Time_Clock), then the resulting signal D will be the same as the original signal B, that is, the original pack header information is therefore recovered by the receiver.

In the preferred embodiment, the functionality described above with respect to Table 4 is accomplished through the use of two registers. In this regard, recall it was earlier stated that each of the isochronous nodes includes a CYCLE_TIME register, and the cycle master copies its time stamp value of 1394_Cycle_Time_Clock to each of these registers. Thus, this CYCLE_TIME register constitutes a first register for accomplishing the present functionality. However, the present inventors recognize that the 1394_

Cycle_Time_Clock value in each node's CYCLE_TIME register is thereafter changed, such as when it is incremented each 40 nanoseconds thereafter by the system clock frequency of 24.576 MHz. Accordingly, to achieve the earlier-described bitwise operation, it is desired that a copy of the original 1394_Cycle_Time_Clock value be maintained. Since this time is changed, then a receiver of a packet may have a different value in its CYCLE_TIME register than the sender had when it transmitted the packet. In this regard, therefore, in the preferred embodiment a second register, referred to in this document as a CYCLE_START_TIME register, is added to the 1394 link layer controller of each node. The CYCLE_START_TIME register stores the exact value of the cycle_time_data received in the cycle start packet, that is, it stores a copy of the 1394_Cycle_Time_Clock value, which reflects the time at which the present cycle started. Moreover, in the preferred embodiment, the CYCLE_START_TIME register is different from the existing 1394_CYCLE_TIME register in that it is not incremented by the 24.576 MHz system clock. As a result, both the transmitting and receiving node have a same stored indication of the 1394_Cycle_Time_Clock value and, thus, both the first and second bitwise operations of Table 4 may be performed in view of that value. In addition, in the preferred embodiment the value stored in the CYCLE_START_TIME register cannot be accessed by a register read from either the system or the 1394 bus, or from anything outside the integrated circuit chip that includes the register (e.g., a local computer or processor bus). Thus, the 1394_Cycle_Time_Clock value is inaccessible to a pirate who may attempt to obtain that value to provide an unauthorized bitwise operation to locate the proper timing for an incoming signal. Lastly, note that the recovery of the pack or TP header is preferably implemented in hardware within the special 1394 link layer controller. Triggering of this operation is keyed to the t-code reserved for copy protected data, plus the identifiers for MPEG or other compressed data formats.

Given the above, note further that although it is possible for a pirating application to read the receiving node's CYCLE_TIME register after the beginning of an isochronous cycle, it will have been incremented by the local 24.576 MHz clock, giving an incorrect value for processing the pack header. This is a consequence of the time required to process the cycle start interrupt, plus the crossing of clock synchronization boundaries between the system processor and the 1394 link layer controller. To further increase the likelihood of a pirate's corrupting the pack header data with the incremented 1394 cycle time register value, the ordering of the bits of the value of the1394_Cycle_Time_Clock, which is in the new CYCLE_START_TIME register, may be reversed. In other words, the present inventive scope contemplates either the earlier-described selected bits, or other possible rearrangement of the time value bits as well.

Figure 6:
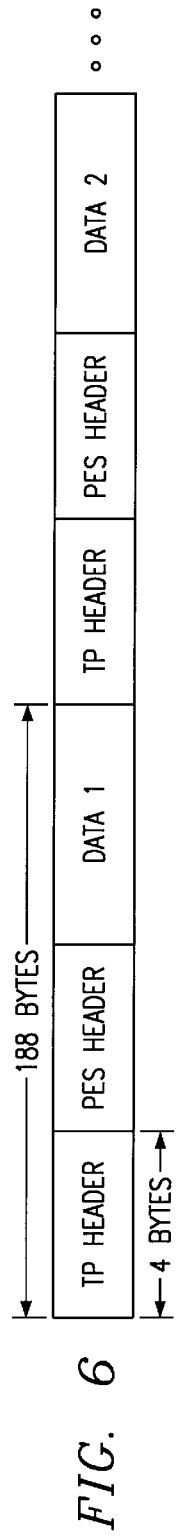
FIG. 6 illustrates the basic structure of a transport stream.

In another aspect of the preferred embodiment, an approach similar to that just described relating to protecting a program stream also can be used for MPEG transport stream data protection. The basic structure of a transport stream is shown in FIG. 6, consisting of 188-byte packets, where each packet consists of a 4-byte transport packet (TP) header, followed by PES header and data. In this embodiment, a bitwise logical operation performed on MPEG_System_Clock_Reference for program streams is performed here on the TP header.

The third level of the data protection system of the present invention, used for packaged digital media such as DVD or D-VCR, preferably utilizes an authenticating transponder embedded into the media (e.g., disk) and which can be "interrogated." A low cost and reliable solution to this scheme has been developed using a variation of an existing product developed by Texas Instruments Incorporated, called TIRIS™ (Texas Instruments Registration and Identification System). TIRIS comprises a flat passive RF semiconductor transponder package, which in the preferred embodiment is bonded or embedded to the data protected media package. In the preferred embodiment, this transponder package is interrogated, such as by a device having access to the data protected media package (e.g., a DVD player), and the response from the interrogation is used to unscramble data stored on the package. TIRIS is described in a great number of publications including U.S. Pat. No. 5,053,774, hereby incorporated herein by reference. The remainder of this section is couched in terms of DVD data protection but the technology is equally applicable to other packaged digital media such as D-VCR. In addition, while TIRIS remains the preferred method for identifying the manner of encoding as detailed below, other machine-readable techniques may be associated with the packaged medium as well.

In the preferred embodiment, compressed data to be stored on DVD is subjected to a scrambling process and then stored in the scrambled order on the DVD. More particularly, data corresponding to each pack is scrambled by interchanging the order of the various digital bits according to a scramble pattern such as shown below, and this scrambled pattern is stored on the DVD. The scramble pattern used changes from pack to pack in some random order, as shown below in Table 5 by way of example.

TABLE 5

| Scramble pattern | Input bit order (i.e., position of bits when unscrambled) | (i.e., Output bit order (i.e., position of bits as scrambled and stored on medium) |
|---|---|---|
| Scramble pattern 1: | 7,6,5,4,3,2,1,0 | 0,1,2,3,4,5,6,7 |
| Scramble pattern 2: | 7,6,5,4,3,2,1,0 | 7,5,3,1,0,2,4,6 |
| . | . | . |
| . | . | . |
| . | . | . |
| Scramble pattern n: | 7,6,5,4,3,2,1,0 | 4,5,6,7,0,1,2,3 |

To further appreciate the illustration of Table 5, consider the top row of the table. First, the "input bit order" of the second column represents the normal ordering of the bits before they are scrambled and, hence, is shown in a customary ordering (i.e., 7,6,5,4,3,2,1,0). However, rather than storing the data on the package medium in this customary order, the data is instead scrambled into a different order. In this regard, the "output bit order" of the third column illustrates a corresponding scramble pattern showing how the customary ordering is re-arranged to a different order. Particularly, in the example of the second row of Table 5, the scramble pattern is 0,1,2,3,4,5,6,7. Given this scrambled format and as detailed below, in response to information provided by the transponder which is provided with the package medium, ultimately this data is unscrambled, preferably by a receiver such that the order of these bits as interpreted by the receiving device is returned to the customary ordering of 7,6,5,4,3,2,1,0. In addition, recall it is earlier stated that the scramble pattern changes from pack to pack. In the example of Table 5, therefore, the second row illustrates a different scrambling order for a second data pack, and so forth for the rest of the Table.

In the preferred embodiment, the sequence of scramble patterns is repeated after n scramble patterns have been used.

A suggested number of scramble patterns to use (value of n) is 256. Thus, the 257$^{th}$ pack is scrambled in the same manner as the 1$^{st}$ pack, the 258$^{th}$ pack is scrambled in the same manner as the 2$^{nd}$ pack, and so forth. The total number of such patterns possible for m bits of data is m!. For 8-bit data, the number of patterns is 8!=40,320. This is the total number of scramble patterns possible. Any given DVD/TIRIS combination may use n=256 of these patterns. Each possible scramble pattern is assigned a unique numerical code, referred to herein as Scramble_Pattern_ID. The sequence of codes corresponding to the sequence of scramble patterns used in a particular DVD is stored on the corresponding TIRIS. The TIRIS-based data protected transmission scheme is shown in FIG. 7.

Figure 7:
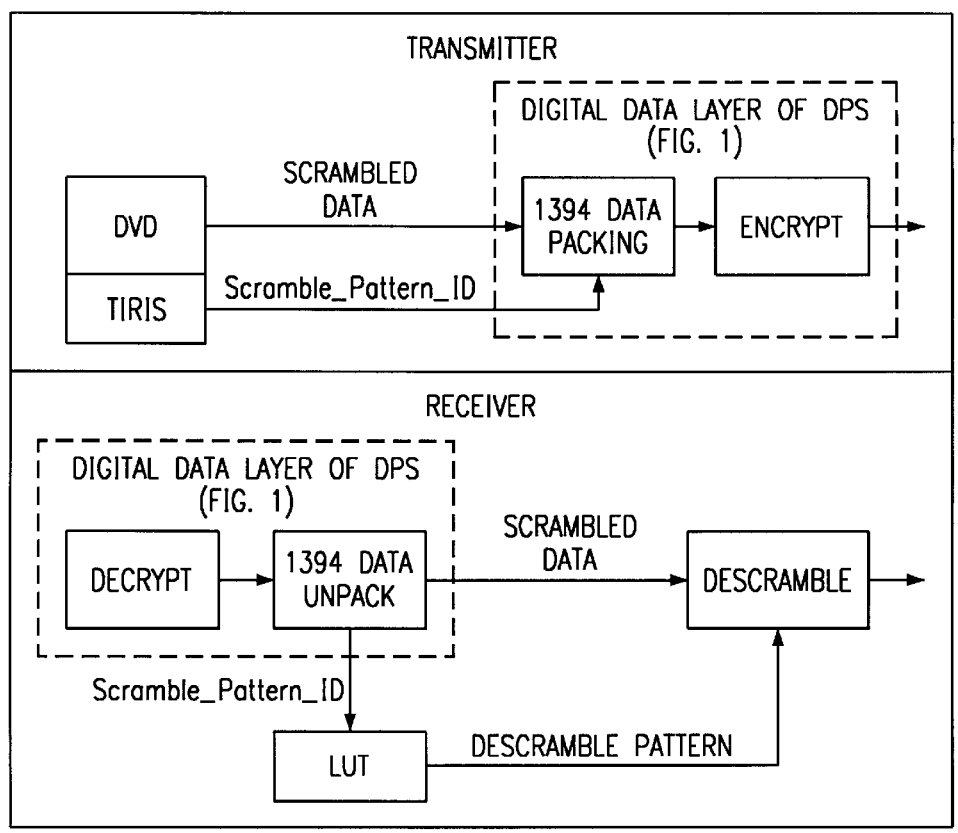
FIG. 7 illustrates a packaged data protection scheme in accordance with an inventive embodiment.
Figure 8:
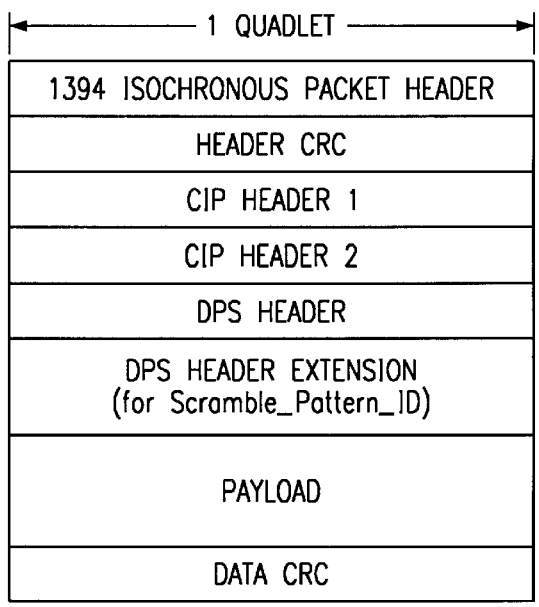
FIG. 8 illustrates a 1394 packet used for packaged data protection in accordance with the scheme illustrated in FIG. 7.

Turning to FIG. 7, on the transmitter side, the scrambled data is read off the DVD, along with the corresponding Scramble_Pattern_ID from TIRIS. More specifically, therefore, the transmitter includes sufficient circuitry to interrogate the transponder on the DVD. Such circuitry is not shown in FIG. 7, but is readily ascertainable by one skilled in the art given the above-incorporated U.S. Pat. No. 5,053,774, and other references discussing TIRIS technology. In response to the interrogation, the transponder provides the sequence of stored Scramble_Pattern_IDs, so these may be thought of as a table having the variable n, introduced above, of these Scramble_Pattern_IDs. In a preferred implementation, a number of these table entries may be read off TIRIS as sequence of Scramble_Pattern_IDs on DVD spinup and stored in a buffer, since reading TIRIS during DVD play can be a problem due to RF interference from other parts of the system. Thus, in the example provided above where n equals 256, then either immediately prior to or at spinup the transmitter reads all 256 Scramble_Pattern_IDs into a buffer. The buffer may be a location in memory and, in the preferred embodiment, this information is only retained in memory while the DVD (or other packaged medium) remains in place in the transmitter. Next, the scrambled data pack and corresponding Scramble_Pattern_ID are packaged into 1394 packets for transmission on to the 1394 medium. In the preferred embodiment, these 1394 packets are in the format shown in FIG. 8, where a quadlet-long data protection system header extension (shown as "DPS HEADER EXTENSION) is defined to accommodate the Scramble_Pattern_ID. For 8-bit data, since there can be a total of 40,320 unique scramble patterns, each unique pattern requires over 15 bits for representation. Using a quadlet to represent Scramble_Pattern_IDs ensures that all patterns can be uniquely represented for 8-bit data with room for extension to greater bit widths which may be used for future DVD data representation.

After being combined into 1394 packet form, the data is preferably encrypted and then transmitted on to the 1394 medium. Looking to FIG. 7 on the receiver side, the data is received from the 1394 medium and is decrypted and unpacked from 1394 packets according to the base layer digital data protection system explained earlier. The Scramble_Pattern_ID is used as an index into a look-up table (LUT) whose output is the corresponding descrambled pattern. This pattern is used to descramble the scrambled data.

As another aspect to the transmission and receipt of the Scramble_Pattern_IDs as just described, note that a system according to the preferred embodiment may further include an additional level of security for ensuring that genuine media data is being communicated across the 1394 bus. Specifically, the providers of packaged media have indicated concern that once data is available on the 1394 bus, a pirating device may be added to that bus to intercept or copy the data for unauthorized use. To eliminate or minimize this risk, in the preferred embodiment there are also periodic checks in connection with the TIRIS provided information to ensure that the original authentic packaged medium (e.g., the DVD with the TIRIS) is still in the transmitter (e.g., in the player for a DVD). In one implementation of this aspect, each time a new device is added to the 1394 bus then such a check occurs. More specifically, it is known under 1394 systems that a reset or other type of detection occurs when a new device is added to the 1394 bus. Thus, upon such an event, in the preferred embodiment there is an evaluation of whether the authentic packaged medium is still located in the transmitter. To implement this operation, recall it was stated above that the already-read scramble patterns are read from the TIRIS into a buffer memory, and that in the preferred embodiment this information is only retained in memory while the DVD (or other (c) The next 64 most significant bits are extracted from DHKEY to produce a value for a DES initialization vector which will be referred to as IV1;

(d) KEY1 and IV1 are used by the transmitter to encrypt, using DES in CBC mode, the current session key;

(e) This encrypted key is then transmitted to the new receiver; and (f) The new receiver decrypts the value which it will now use as a key for decrypting the isochronous packets.

The key exchange mechanism will use the asynchronous communication capabilities of the 1394 interface. A standardized address and block of register space is assigned for this communications process.

Establishment and control of the connections between the receiving and transmitting devices may be performed using the Connection Management Procedures (CMP) defined in Clause 8 of the DVC "Bluebook" Part 1, on digital interface, hereby incorporated herein by reference. These are managed as point-to-point connections only; broadcast connections are not permitted. The CMP allows for multiple point-to-point connections to be made to one output plug, which provides for a multicast mode of operation.

In certain applications where authentication of new devices on the 1394 bus is required, such as when introducing a new device into the network, public key certificates will be used. When the devices are manufactured, each device has a 640-bit public/private key pair generated using the Digital Signature Standard method for key generation. The private key is used to sign the device's public key certificate. Each certificate contains a minimum of the following information fields shown in Table 6 and conforms to the syntax requirements of X.509 standard. packaged medium) remains in place in the transmitter. Accordingly, to achieve the later check following a reset, the preferred embodiment determines whether the scramble patterns are still valid in the memory. If not, the system concludes that the authentic packaged medium has been removed, and in response the data from that medium is prohibited from being communicated along the 1394 bus. On the other hand, if the scramble patterns are still stored and valid in the memory, then the data from the packaged medium may be properly communicated along the 1394 bus, and it may then be received and descrambled in the manner described above. Lastly, note that the immediately preceding additional check may occur at times other than at reset, and the evaluation of whether the packaged medium is still located in the transmitter may be achieved by other techniques (e.g., by causing the transponder to once again provide information or confirmation to the transmitter that the packaged medium is still located in the transmitter).

Having now explained the three levels of protection provided by a data protection system in accordance with the preferred embodiments, reference is now turned to the startup operation-and new device handling for a 1394 network configured to perform one or more of the data protection methodologies described above. When a new receiver device is introduced into the 1394 network, or when transmission is first initiated, the transmitter must provide the receiver with the current session key being used to encrypt the isochronous packets. This key transfer will occur using the asynchronous communication capabilities of 1394 as follows:

(a) At startup, the Diffie-Hellman algorithm, as described in Diffie, M. E. Hellman, "New Directions in Cryptography", IEEE Transactions on Information Theory IT-22 (1976), pg. 644–54, hereby incorporated herein by reference, is used between the transmitter and the new receiver to exchange a unique 512-bit key, called DHKEY;

(b) The 64 most significant bits are extracted from DHKEY to form a new key referred to as KEY1;

TABLE 6

| Field No. | Information | Length |
| --- | --- | --- |
| 1 | Device serial number | 64 bits |
| 2 | Manufacturer ID number | 32 bits |
| 3 | Date of device manufacture | 64 bits |
| 4 | Manufacturer extension | 32 bits |
| 5 | Public key | 640 bits |
| 6 | Digital signature | 320 bits |
| | Total | 1,152 bits |

The device serial number is unique for each manufactured device. The manufacturer extension allows manufacturers to insert additional information for customization of the certificates. The digital signature is computed by hashing field numbers 1–5 (using SHA-1) then signing that hash value using DSS and the device's private key. When a new device is added to the 1394 bus, the asynchronous communication capabilities of the 1394 are used to send the device's certificate to the transmitter. The transmitter hashes the certificate and uses the public key and digital signature as input to the verification operations of DSS. If the DSS authentication fails, key exchange through Diffie-Hellman will not occur.

While details of overall system implementation cost, in terms of gate counts or software cycles, is not yet known, it is estimated that the data protection system as disclosed herein may be implemented at a cost suitable for consumer application. The approach of the present invention makes use of various well-known cryptography algorithms which are already available in various forms from various vendors:

DES algorithm implementation for encryption and decryption (DES engine) is available from a vendor as an approximately 4000 gate solution.

Diffie-Hellman is used for key exchange across the asynchronous communication mechanism of the 1394 interface. Since there are no hard real-time requirements for this, speed of computation is not a major issue. Implementation may be feasible on a midspeed microcontroller.

The random number generation is used in the transmitter and receiver for Diffie-Hellman and X9.17 key generation. The choice of a pseudo-random number generator (PRNG) can be independent for the transmitter and receiver since they do not need to generate the same sequence of random numbers. Care must be taken, however, to choose a PRNG which is cryptographically strong. Some general considerations for the PRNG are:

(a) Seeds for the PRNG are created by using the system clock or some permutation of the system clock;

(b) Knowledge of previous bits of a PRNG sequence will not allow for prediction of future bits;

(c) No linear feedback shift register schemes should be implemented since it is possible to determine the feedback patterns; and (d) Since PRNGs are inherently periodic, the period should be very large.

The data protection system may use a complex algorithm for the PRNG because there are no real-time requirements for number generation, other than the time requirement that new keys must be generated within the time frame of 50 isochronous packets bundle.

Possible implementations of pseudo-random number generators include the Blum/Micali algorithm, computational complexity $O(n^3)$, and the Blum/Blum/Shub algorithm, computational complexity $O(n^2)$, both of which are described in Bellare, S. Goldwasser, "Lecture Notes on Cryptography", Massachusetts Institute of Technology, July 1996, pg. 39–47, hereby incorporated herein by reference.

Having appreciated the above, one skilled in the art will understand that the data protection system of the present embodiments provides several advantages over systems of the prior art. For example, the present approach provides a range of data protection options, from general data protection for all digital data transmitted over the 1394 interface, to specific protection mechanism for packaged content such as DVD. As another example, the present approach introduces to 1394 communication cryptographic techniques that have been used in various forms in several other communication environments such as cable modems, ISDN, TCP/IP networks, Internet Privacy-Enhanced Mail (PEM), Smart Cards, and defense applications. As still another example, using the system disclosed herein, standard, well-known cryptographic techniques may be integrated with proprietary approaches. In this regard, the "strength" of a cryptographic technique is often determined by how well it stands the test of time, surviving various attack efforts. Standard techniques have proven success in this as testified by their prolific use in the application areas listed above. On the other hand, proprietary approaches are used where they provide specific strengths. As yet another example, the fact that elements of the preferred embodiment have widespread application in various communication environments ensures a broader demand base for the technology components, leading to low cost components availability from various competing vendors. Given these many examples, one skilled in the art will appreciate the scope and flexibility of the preferred embodiments. Moreover, while the present embodiments have been described in detail, various substitutions, modifications or alterations could be made to the descriptions set forth above without departing from the inventive scope which is defined by the following claims.

What is claimed is:

1. An information package medium including a transponder, comprising:

means for storing a plurality of data quantities, wherein each of the plurality of data quantities comprises a set of scrambled bits; and a plurality of machine-readable scramble code numbers (Scramble_Pattern_ID), wherein each of the plurality of machine-readable scramble code numbers corresponds to one of the plurality of data quantities and indicates a manner of descrambling the corresponding one of the plurality of data quantities;

the plurality of scramble code numbers are stored sequentially in the transponder;

each of the plurality of machine-readable scramble code numbers indicates a manner of descrambling the corresponding one of the plurality of data quantities by indicating a pattern for reordering the set of bits in the corresponding one of the plurality of data quantities;

the plurality of scramble code numbers are transmitted in sequence by the transponder and used as indexes to a look-up-table whose output is a plurality of descrambled patterns used in descrambling the corresponding plurality of scrambled data quantities; and wherein the plurality of data quantities comprises a first plurality of data quantities;

and further comprising means for storing a second plurality of data quantities, wherein each of the second plurality of data quantities comprises a set of bits; and wherein each of the plurality of machine-readable scramble codes further corresponds to each of one of the first plurality of data quantities and one of the second plurality of data quantities and indicates a same manner of descrambling both the corresponding one of the first plurality of data quantities and the corresponding one of the second plurality of data quantities; and the plurality of machine-readable scramble codes are repeated in the same order after the plurality of machine-readable scramble codes have all been used to descramble data quantities.

2. The information package medium of claim 1 wherein the transponder is used for transmitting the plurality of machine-readable scramble codes.

3. The information package medium of claim 2 wherein each of the plurality of machine-readable scramble codes indicates a manner of descrambling the corresponding one of the plurality of data quantities by indicating a pattern for reordering the set of bits in the corresponding one of the plurality of data quantities.

4. The information package medium of claim 2 wherein the transponder is for transmitting the signal indicating the plurality of machine-readable scramble codes in response to an interrogation signal.

5. The information package medium of claim 1 wherein the plurality of data quantities represent DVD data.

6. The information package medium of claim 1 wherein the plurality of data quantities represent D-VCR data.

7. A method of communicating from a transmitter to a receiver over a communications medium, comprising the steps of:

in the transmitter, the steps of:
reading a plurality of scrambled data quantities from an information package medium having a transponder, wherein each of the plurality of data quantities comprises a set of bits;

reading a plurality of machine-readable scramble code numbers (Scramble_Pattern_ID) sequentially from the transponder, wherein each of the plurality of machine-readable scramble code numbers corresponds to one of the plurality of data quantities and indicates a manner of descrambling the corresponding one of the plurality of scrambled data quantities;

formatting the plurality of data quantities and the plurality of scramble code numbers into a data stream to be communicated across the communications medium; and transmitting the data stream on to the communications medium; in the receiver, the steps of:

receiving the data stream from the communications medium;

decoding the data stream in order to recover the plurality of scramble-code numbers;

using the scramble-code numbers as indexes to a look-up-table whose output is a plurality of descrambled patterns used in descrambling the corresponding plurality of scrambled data quantities; and wherein the plurality of data quantities comprises a first plurality of data quantities;

wherein the data stream comprises a first data stream;

and further comprising, in the transmitter, the steps of:
reading a second plurality of data quantities from the information package medium, wherein each of the second plurality of data quantities comprises a set of bits;

formatting the second plurality of data quantities into a second data stream to be communicated across the communications medium;

transmitting the second data stream on to the communications medium;

wherein each of the plurality of machine-readable scramble codes further corresponds to each of one of the first plurality of data quantities and one of the second plurality of data quantities and indicates a same manner of descrambling both the corresponding one of the first plurality of data quantities and the corresponding one of the second plurality of data quantities; and the plurality of machine-readable scramble codes are repeated in the same order after the plurality of machine-readable scramble codes have all been used to descramble data quantities.

8. The method of claim 7 and further comprising the step of descrambling the corresponding one of the plurality of data quantities in response to the plurality of machine-readable scramble codes.

9. The method of claim 8:
and further comprising the step of, in the receiver, receiving the data stream; and
wherein the receiver performs the descrambling step.

10. The method of claim 8 wherein the receiver performs the descrambling step in response to the plurality of machine-readable scramble codes in the data stream.

11. The method of claim 8 wherein each of the plurality of machine-readable scramble codes indicates a manner of descrambling the corresponding one of the plurality of data quantities by indicating a pattern for reordering the set of bits in the corresponding one of the plurality of data quantities.

12. The method of claim 8:
wherein the information package medium further comprises a transponder;
and further comprising the step of in the transmitter, sending an interrogation signal to the transponder; and
wherein the step of reading the plurality of machine-readable scramble codes comprises receiving the plurality of machine-readable scramble codes in response to the interrogation signal.

13. The method of claim 12 wherein the step of receiving the plurality of machine-readable scramble codes comprises receiving an RF signal representing the plurality of machine-readable scramble codes.

14. The method of claim 12 and further comprising, responsive to the interrogation signal, transmitting a signal with the transponder indicating the plurality of machine-readable scramble codes.

15. The method of claim 12:
and further comprising, responsive to the interrogation signal, transmitting an RF signal with the transponder representing the plurality of machine-readable scramble codes; and
wherein the step of receiving the plurality of machine-readable scramble codes comprises receiving the RF signal representing the plurality of machine-readable scramble codes.

16. The method of claim 7 and further comprising the step of descrambling the corresponding one of the second plurality of data quantities in response to the plurality of machine-readable scramble codes.

17. The method of claim 8 wherein the plurality of data quantities represent DVD data.

18. The method of claim 17 wherein the step of reading a plurality of machine-readable scramble codes from the information package medium comprises reading the plurality of machine-readable scramble codes from a DVD storing the DVD data no later than during spinup.

19. The method of claim 8 wherein the plurality of data quantities represent D-VDR data.

20. The method of claim 7 and further comprising the steps of:
determining whether the information package is currently located in the transmitter; and
responsive to determining that the information package has been removed from the transmitter, prohibiting the data quantities from being written from the transmitter on to the communications medium.

21. The method of claim 20 wherein the determining step occurs in response to attaching a node to the communications medium.

22. The method of claim 21 wherein the communications medium complies with the IEEE 1394 High Performance Serial Bus communications standard.

23. The method of claim 7 wherein the communications medium complies with the IEEE 1394 High Performance Serial Bus communications standard.

* * * * *